United States Patent
Oltikar et al.

(10) Patent No.: US 12,473,242 B2
(45) Date of Patent: Nov. 18, 2025

(54) SYSTEM FOR COATING FERTILIZER SUBSTRATES

(71) Applicant: UPL LTD, Haldia (IN)

(72) Inventors: Vikas Vinayak Oltikar, Mumbai (IN); Rajan Ramakant Shirsat, Mumbai (IN); Jaidev Rajnikant Shroff, Dubai (AE); Vikram Rajnikant Shroff, Dubai (AE)

(73) Assignee: UPL LTD, Haldia (IN)

(*) Notice: Subject to any disclaimer, the term of this patent is extended or adjusted under 35 U.S.C. 154(b) by 984 days.

(21) Appl. No.: 17/625,818

(22) PCT Filed: Sep. 2, 2019

(86) PCT No.: PCT/IB2019/057380
§ 371 (c)(1),
(2) Date: Jan. 10, 2022

(87) PCT Pub. No.: WO2021/005408
PCT Pub. Date: Jan. 14, 2021

(65) Prior Publication Data
US 2022/0315506 A1    Oct. 6, 2022

(30) Foreign Application Priority Data
Jul. 11, 2019 (IN) .............. 201931027754

(51) Int. Cl.
*C05G 5/30* (2020.01)
*B01F 35/50* (2022.01)
(Continued)

(52) U.S. Cl.
CPC ............... *C05G 5/37* (2020.02); *B01F 35/50* (2022.01); *B01J 2/006* (2013.01); *C05C 9/005* (2013.01); *B01F 2101/32* (2022.01)

(58) Field of Classification Search
CPC .. C05G 5/37; B01F 35/50; B01J 2/006; C05C 9/005
See application file for complete search history.

(56) References Cited

U.S. PATENT DOCUMENTS

| | | |
|---|---|---|
| 5,538,531 A | 7/1996 | Hudson et al. |
| 6,358,295 B1 | 3/2002 | Tabei et al. |

(Continued)

FOREIGN PATENT DOCUMENTS

| | | | | |
|---|---|---|---|---|
| CN | 102424640 A | * | 4/2012 | |
| WO | WO-2015199696 A1 | * | 12/2015 | ........ A61J 3/005 |
| WO | WO 2019162770 A1 | * | 8/2019 | ........ C05G 3/00 |

OTHER PUBLICATIONS

Machine Translation of CN-102424640-A.*
(Continued)

*Primary Examiner* — Wayne A Langel
(74) *Attorney, Agent, or Firm* — CANTOR COLBURN LLP

(57) ABSTRACT

A system for coating fertilizer substrates is provided. The system comprises a mixing unit wherein the mixing unit comprises a container bowl having an inlet portion and an outlet portion wherein the inlet portion is operatively fastened to a hot air conduit having a blowing unit connected at one end. The invention also relates to a process for coating fertilizer substrates and the coated substrates thereof.

11 Claims, 1 Drawing Sheet

(51) Int. Cl.
*B01J 2/00* (2006.01)
*C05C 9/00* (2006.01)
*B01F 101/32* (2022.01)

(56) References Cited

U.S. PATENT DOCUMENTS

| | | | |
|---|---|---|---|
| 8,016,907 B2 * | 9/2011 | Sanders | C05C 1/02 |
| | | | 71/11 |
| 2004/0016276 A1 | 1/2004 | Wynnyk et al. | |
| 2015/0375234 A1 * | 12/2015 | McClung, III | C09K 8/03 |
| | | | 241/1 |

OTHER PUBLICATIONS

International Search Report and Written Opinion for International Application PCT/IB2019/057380; International Filing Date: Sep. 2, 2019; Date of Mailing: Dec. 17, 2019; 13 pages.

* cited by examiner

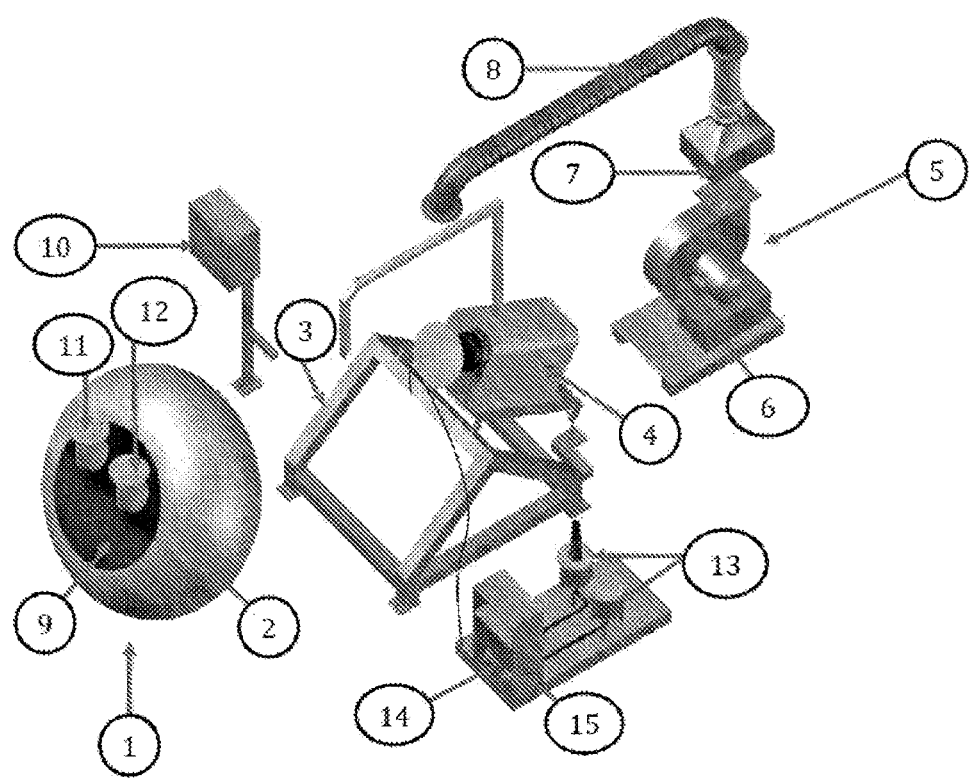

SYSTEM FOR COATING FERTILIZER SUBSTRATES

CROSS REFERENCE TO RELATED APPLICATIONS

This application is a National Stage application of PCT/IB2019/057380, filed Sep. 2, 2019, which claims the benefit of priority to Indian patent application Ser. No. 201931027754, filed Jul. 11, 2019, both of which are incorporated by reference in their entirety herein.

FIELD OF INVENTION

The present invention relates to a system for coating fertilizer substrates. The invention also relates to a process for coating fertilizer substrates and the coated substrates thereof.

BACKGROUND

Several devices and methods are conventionally known for coating fertilizer substrates. Conventionally, coatings are made for controlling the release of fertilizer and the coatings included resins and waxes. Some of the key challenges involved in coating fertilizer substrates include obtaining adequate adherence of the coating over the substrates, ensuring homogeneity of distribution of the coating over the substrate, and preventing agglomeration of particles during the process of coating. Achieving adherence on a solid substrate coated by solid particles is challenging and uniform adherence of solid particles over the substrate is essential in ensuring homogeneity of the coating. Though adherence promoters could be employed to solve this problem, practically, in the presence of such promoters, substrate surfaces tend to agglomerate. Further the device used for coating are required to be kept in an environment that does not facilitate degradation of the fertilizer substrates. There is therefore a need to have a device for coating fertilizer substrates that solve the above referred problems in the art.

SUMMARY OF INVENTION

The present invention provides a system for coating a fertilizer.

The invention provides a system comprising a mixing unit wherein the mixing unit comprises a container bowl having an inlet portion and an outlet portion wherein the inlet portion is operatively fastened to a hot air conduit having a blowing unit connected at one end.

In one embodiment, the invention provides a system comprising a mixing unit wherein the mixing unit comprises a container bowl having an inlet portion and an outlet portion wherein the inlet portion is operatively fastened to a hot air conduit having a blowing unit connected at one end, wherein the blowing unit comprises a heating element In one embodiment, the invention provides a system comprising a mixing unit wherein the mixing unit comprises a container bowl having an inlet portion and an outlet portion wherein the inlet portion is operatively fastened to a hot air conduit having a blowing unit connected at one end, wherein the mixing unit is adapted to be mounted on a mounting unit In one embodiment, the invention provides a system comprising a mixing unit wherein the mixing unit comprises a container bowl having an inlet portion and an outlet portion wherein the inlet portion is operatively fastened to a hot air conduit having a blowing unit connected at one end, wherein the mixing unit is adapted to be mounted on a mounting unit and wherein the mounting unit is adapted to mount a drive motor and a gear box In one embodiment, the invention provides a system comprising a mixing unit wherein the mixing unit comprises a container bowl having an inlet portion and an outlet portion wherein the inlet portion is operatively fastened to a hot air conduit having a blowing unit connected at one end wherein the blowing unit is adapted to provide a hot air blow into the inner volume of the mixing unit.

In one embodiment, the invention provides a system comprising a mixing unit wherein the mixing unit comprises a container bowl having an inlet portion and an outlet portion wherein the inlet portion is operatively fastened to a hot air conduit having a blowing unit connected at one end wherein the system is adapted to first coat a fertilizer substrate with a gel to form a gel-coated substrate and then coat the gel-coated substrate with a powder. In one embodiment, the invention provides a system comprising a mixing unit wherein the mixing unit comprises a container bowl having an inlet portion and an outlet portion wherein the inlet portion is operatively fastened to a hot air conduit having a blowing unit connected at one end wherein the system is adapted to first coat a fertilizer substrate with a gel to form a gel-coated substrate and then coat the gel-coated substrate with a powder, wherein the powder comprises a super absorbent polymer.

In another embodiment the invention provides a process for coating a fertilizer, the process comprising charging a mixing unit with a fertilizer substrate, first coating the substrate with a gel to form a gel-coated substrate then coating the gel-coated substrate with a powder.

In a further embodiment, the invention provides coated particles prepared by the process of the invention wherein the coated particulates consist essentially of a fertilizer substrate and a super absorbent polymer.

BRIEF DESCRIPTION OF THE DRAWINGS

The accompanying drawing, which is included to further illustrate an embodiment of the invention and together with the description serve to explain the principles of the invention. It is meant to be an exemplary illustration provided to enable persons skilled in the art to practice the disclosure and is not intended to limit the scope of the appended claims.

FIG. 1 displays an exploded view of an embodiment of the system of the present invention

DETAILED DESCRIPTION OF PREFERRED EMBODIMENTS

Turning now to FIG. 1, the system according to the present invention comprise a mixing unit (1). The mixing unit (1) comprises a container bowl (2) to coat fertilizer substrates with a superabsorbent polymer as well as an inlet portion (11) and an outlet portion (12). The mixing unit (1) can have various configurations. In one embodiment, the mixing unit has a container bowl (2) having an oblate spheroidal configuration. The mixing unit is adapted to be mounted on a mounting unit (3). The mixing unit can contain plurality of blades adapted to first ensure intimate mixing of the fertilizer substrates with a gel and then the powder to ensure intimate mixing of gel coated substrates by the SAP powder. The blades can have a first leg that is attached to the interior periphery of the container bowl and a second leg extending to the interior volume of the bowl towards the vertical axis of rotation of the bowl. When the mixing unit is mounted on a mounting unit, it is driven by a drive motor and a gear box (4) mounted on the mounting unit (3) to ensure adequate mixing of the contents of the container bowl. The drive motor is placed at the exterior of the mixing unit in contact with a gear system. The drive motor rotates the gear system which in turn rotates the mixing unit. The mixing unit is usually provided with a removable lid at its mouth that allows charging of fertilizer substrates, dispensing of a gel and for charging superabsorbent polymer. The gel is usually prepared in a gel preparation unit (13). The gel may be dispensed to the contained bowl (2) by way of a gel-dispensing unit (14) mounted in a cabinet (15). Typically, the gel dispensing unit comprise a peristaltic pump. Subsequent to addition of the gel, container bowl is charged with a superabsorbent polymer powder and mixed thoroughly. The blowing unit (5) comprises an air blower (6) and an heating element (7). Air blown from the air blower (6) is heated by the heating element (7) and the hot air is conveyed through a conduit (8) terminating at the inlet portion (11) of the container bowl (2). The hot air blow is made after mixing the superabsorbent polymer powder with the gel-coated fertilizer substrates. Hot air usually exits the container bowl through an outlet portion (12) of the container bowl (2). The fertilizer substrates used for coating superabsorbent polymers can have various morphologies. Typically, the fertilizer substrates are in the particulate form.

The invention also provides a process for coating fertilizer. The process of the invention involves first charging the fertilizer substrates to a container bowl (2), preparing a gel to be dispensed into the container bowl for intimate mixing with the fertilizer substrates, then charging a superabsorbent polymer powder to the gel-coated fertilizer substrates. The gel material used in the system and process of the invention can comprise a material suitable to form gel from 1.5 to 10% by weight of the fertilizer. Advantageously, a starch based superabsorbent polymer is used as the gel formation material. Most advantageously, the gel is used at a concentration of 1.5% to 5% by weight of the fertilizer. Though various materials that form a gel could be used, the gel formation material is preferably a polymer, for example Xanthan gum. Other gel forming material include Rhodopol 23® and various kinds of starch. The concentration of the gel material is optimized and maintained in order to provide sufficient adherence of superabsorbent polymer. In particular, for coating of fertilizer substrates, the gel concentration is of a sufficient level to allow superabsorbent powder coating while minimizing the loss of nutrient value, for example, nitrogen availability to crop plants. Keeping the amount of gel low helps to avoid the formation of lumps during mixing process of gel. After dispensing the gel and thorough mixing of the gel with the fertiliser, the mixture is treated with a hot air blow from the blowing unit, resulting in a free-flowing coated fertilizer substrates. Typically, the heating element is set at a temperature in the range of 70 to 100° C. for heating the air required to provide the hot air blow. The progress of the entire process is monitored to prevent lumping and loss of the fertilizer. The coating process is run as a batch or continuous process.

Various fertilizer substrates can be coated using the system and process of the invention. In one embodiment the fertiliser that is coated is Urea. Other fertilizers that can be coated using the system of the present invention include, but are not limited to, SSP (Single Super Phosphate), Diammonium Phosphate (DAP), DSP (Double super phosphate), NPK and the mixtures thereof Fertilizer particulates is usually uniformly coated with SAP. The thickness of the gel layer and coating material may be varied as per the requirement, but usually coating of uniform thickness is obtained.

Depending upon the method and quantity used to coat the fertilizer substrates, the layer of "Super Absorbent Polymer" (SAP) coating may be obtained at various percentages/thicknesses. Typically, for the fertilizer substrates of the invention, the percentage of polymers used may be from 0.01 to 10% on weight basis. In most cases, SAP coated fertilizer substrates contain about 0.01 to 10% of SAP. In many cases, SAP coated fertilizer substrates comprise about 0.1 to 10% of SAP. Most advantageously, SAP coated particulate fertilizer comprises about 3% of SAP, i.e, 100 Kilogram of SAP coated fertilizer contains 3 Kilogram of SAP.

The system and process of the present invention enables coating of fertilizer substrates with a superabsorbent polymer powder uniformly to result in a free flowing superabsorbent polymer coated fertilizer particles. The system and process of the present invention ensures that the SAP coated fertilizer substrates are coated in such a manner that nutrient value of the fertilizer is not compromised. The system and process of the present invention enables such coating without resulting in lump formation or resulting in agglomeration of individual fertilizer particles. Further, the process of the present invention uses superabsorbent polymer itself as the gel formation material obviating the need of using a separate gel formation material for holding SAP powder that is treated over the gel-coated fertilizer.

The invention is further illustrated by way of the following non-limiting example

EXAMPLE a) Gel preparation 15 g of starch based superabsorbent polymer was scooped into 1 liter of distilled water in a beaker and homogenised thoroughly by a homogenizer until a viscous gel, free from lumps, is obtained b) Coating of UREA with the gel 50 kg of urea was charged into the container bowl of the mixing unit. 1.8 kg of precipitated silica is added to the bowl after this. Gel prepared as in a) above was then dispensed into the container bowl using a dispensing unit, simultaneously starting agitation of the container bowl by means of the motor. The mixture was agitated for 30 minutes after closing the container bowl using a lid.

c) 3 kg of a starch based superabsorbent polymer was added to the gel coated fertilizer prepared as in b) above. The container bowl of the mixing unit was agitated again for about 15 minutes. After 30 minutes, the blowing unit was started and maintained at 80° C. The hot air blow was provided to the container bowl through the inlet portion of the container bowl connected to a hot air conduit. The blow was continued for 15 minutes until a dry, free flowing granules of urea coated superabsorbent polymer was obtained The above description is illustrative only and is not limiting The present invention is defined by the claims that follow and their full range of equivalents.

The invention claimed is:

1. A system for coating a fertilizer substrate, the system comprising a mixing unit, wherein the mixing unit comprises a container bowl having an oblate spheroidal configuration and having an inlet portion and an outlet portion, wherein the inlet portion is operatively fastened to a hot air conduit having a blowing unit connected at one end; and a gel preparation unit and/or a gel dispersing unit, wherein the system is adapted to first coat a fertilizer substrate with a gel to form a gel-coated substrate and then coat the gel-coated substrate with a homogenized powder comprising a super absorbent polymer, wherein the gel comprises a starch-based superabsorbent polymer, and wherein the hot air conduit is adapted to provide a controlled temperature and flow rate to minimize deformation of the coating and nitrogen leachate.

2. The system as claimed in claim 1, wherein the mixing unit is adapted to be mounted on a mounting unit.

3. The system as claimed in claim 2, wherein the mounting unit is adapted to mount a drive motor and a gear box.

4. The system as claimed in claim 1, wherein the blowing unit comprises a heating element and is adapted to provide a hot air blow into the inner volume of the container bowl.

5. The system as claimed in claim 1, wherein the blowing unit is adapted to provide a hot air blow into an inner volume of the container bowl.

6. A process for coating a fertilizer, the process comprising forming a homogenized gel;

charging the mixing unit in the system of claim 1 with a fertilizer substrate;

first coating the fertilizer substrate with the homogenized gel to form a gel-coated fertilizer substrate; and subsequently coating the gel-coated fertilizer substrate with a superabsorbent polymer powder to provide coated fertilizer, wherein the homogenized gel comprises the starch-based superabsorbent polymer.

7. The process as claimed in claim 6, wherein the concentration of the gel is in the range of 1.5% to 10% by total weight of the coated fertilizer.

8. The process as claimed in claim 6, wherein the concentration of the gel is in the range of 1.5% to 5% by total weight of the coated fertilizer.

9. The process as claimed in claim 6, wherein the concentration of the superabsorbent polymer is in the range of 0.1 to 10% by total weight of the coated fertilizer.

10. The process as claimed in claim 6, wherein the fertilizer substrate is selected from the group consisting of urea, single superphosphate and diammonium phosphate, double superphosphate, and NPK.

11. The process as claimed in claim 6, wherein the superabsorbent polymer coated fertilizer substrate is treated with hot air at a temperature in the range of 80 to 100° C.

* * * * *